R. H. SHIVERS.
AUTOMATIC DIRECTOR FOR HEADLIGHTS.
APPLICATION FILED JAN. 15, 1920.

1,348,061.

Patented July 27, 1920.
2 SHEETS—SHEET 1.

Inventor.
R. H. Shivers.
by Wilkinson &
Ginsta
Attorneys.

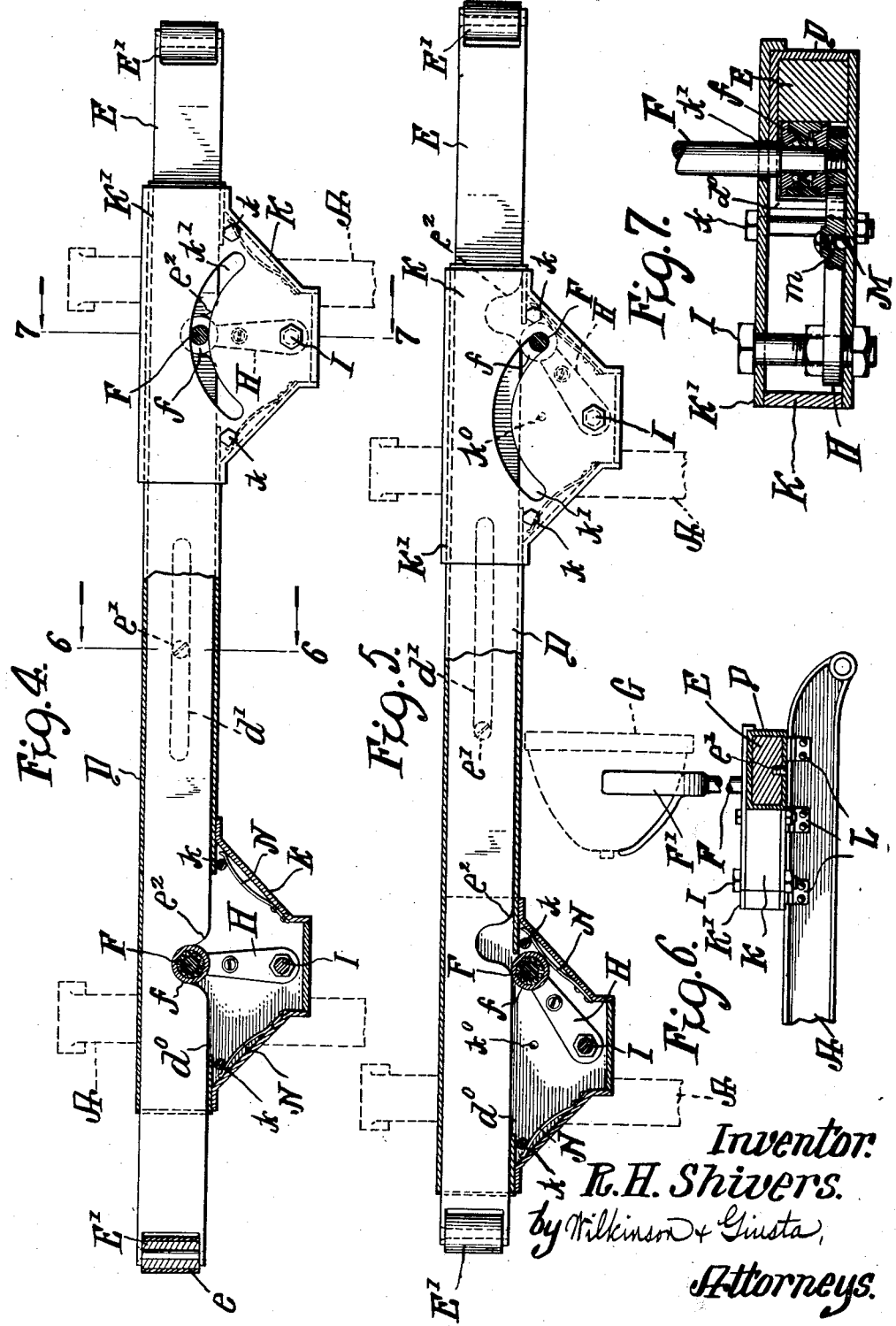

UNITED STATES PATENT OFFICE.

ROBERT HARPER SHIVERS, OF ATLANTA, GEORGIA.

AUTOMATIC DIRECTOR FOR HEADLIGHTS.

1,348,061.   Specification of Letters Patent.   Patented July 27, 1920.

Application filed January 15, 1920. Serial No. 351,536.

*To all whom it may concern:*

Be it known that I, ROBERT HARPER SHIVERS, a citizen of the United States, residing at Atlanta, in the county of Fulton and State of Georgia, have invented certain new and useful Improvements in Automatic Directors for Headlights; and I do hereby declare the following to be a full, clear, and exact description of the invention, such as will enable others skilled in the art to which it appertains to make and use the same.

My invention relates to improvements in automatic directors for headlights, and it consists in providing an attachment automatically operated by the shifting of the front wheels incident to the steering of the vehicle, causing the rays of light from the headlights of the vehicle to be projected upon the roadbed.

When the vehicle is proceeding straight ahead, as along a straight road, the apparatus is so arranged that the rays of light will be thrown straight ahead or in the normal direction; but when turning to the right or left, as the case may be, the apparatus is so arranged that both headlights will be simultaneously turned through an angle to the right or left, as the case may be, thus illuminating the bend in the road.

According to my invention I provide a transverse bar spanning the frame of the vehicle forward of the front axle, and provided with anti-friction rollers adapted to engage the plain sides of a pneumatic tire, there being a clearance space between the said rollers and the adjacent tires so that the said rollers will not be in engagement when the front wheels are in the position for going straight ahead, but will be operated when the steering gear is operated so as to turn the wheels through an appreciable angle as occurs when following the bend of a road.

The invention comprises, in addition to the bar just referred to, certain other coacting parts controlled by the longitudinal movement of the bar, whereby the two headlights are simultaneously operated in a manner that will be hereinafter more fully described.

The invention will be more fully understood after reference to the accompanying drawings, in which like parts are indicated by similar reference symbols throughout the several views, and in which:—

Fig. 4 is a plan view partly in section, but on a larger scale than in the preceding figures, showing the operating bar and the contiguous parts, but with the parts in the position shown in Figs. 1 and 3.

Fig. 5 is a similar view to Fig. 4, but shows the parts in the position indicated in Fig. 2.

Figure 1:
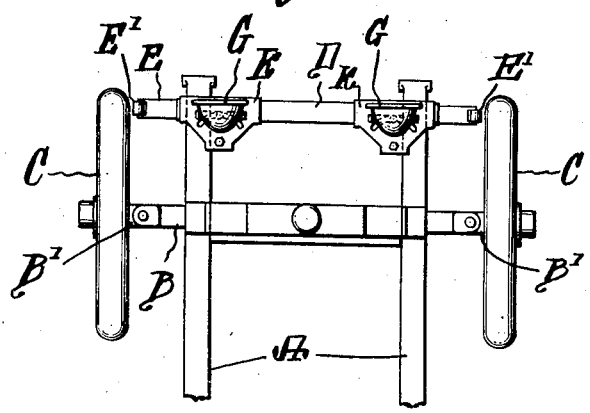
Figure 1 is a diagram showing the front end of the chassis of an automobile with my improved apparatus in plan, and the wheels in position for going straight ahead.

Fig. 6 is a sectional elevation along the line 6—6 of Fig. 4, and looking in the direction of the arrows, the headlights being shown in dotted lines. This figure shows more especially the means of fastening the attachment to the chassis of the vehicle; and Fig. 7 shows a section along the line 7—7 of Fig. 4, and looking in the direction of the arrows, the parts being shown on a larger scale than in Fig. 4.

In the various views the steering gear for operating the wheels is omitted for the sake of clearness in the drawings, such steering gear being well known in the art and not being a part of my present invention.

A represents the main frame of the chassis to which the front axle B is connected in the usual or any convenient way, and the front wheels C are mounted upon the usual stub axles B' which are swung by the steering gear in the usual or in any convenient way.

Secured to the chassis frame above the front axle, and preferably below the headlights, is a sleeve D in which is slidably mounted the sliding bar E, carrying at each end thereof anti-friction rollers E', which rollers are preferably surrounded with a shell $e$ of rubber or other suitable material so as not to cut or unnecessarily wear the exposed sides of the tire.

This bar E may be made of wood or hollow metal, or constructed in any convenient way, and is preferably provided with a stop pin $e'$ engaging in the slot $d'$ of the sleeve D. This pin prevents the bar from being thrown too far when suddenly struck by the wheel in turning, and also serves to prevent the bar from being accidentally removed from the sleeve except when it is desired to do so. The bar E is preferably notched, as at $e^2$, to engage the anti-friction rollers $f$, which rollers are carried at the bottom of the standards F supporting the yokes F' on which the headlights G are mounted.

Pivoted to and supporting these standards F are the crank arms H which are pivoted to the bolts I passing through the boxes K, in which these arms H are mounted. These boxes K are provided with suitable covers K' which may be held in place in any convenient way, as by means of the bolts $k$. These boxes are also secured to the frame of the chassis in any convenient way, as by means of the brackets L, as shown in Fig. 6.

In order to lock the arms H in the centered position I provide any suitable spring locking arrangement, such as the ball M and spring $m$, which ball is pressed into a socket $k^o$ in the bottom of the box K. These balls serve as spring latches to steady the lights in the centered or straight ahead position.

The covers K' of the boxes K are slotted, as shown at $k'$, to permit the vibratory motion of the standards F and the sleeve D, and are also slotted, as at $d^o$, to permit the swinging in and out of the arms H and the anti-friction rollers $f$.

In order to lessen the shock, if the lights are swung too quickly to the right or left, as when the front wheels are deflected very quickly, suitable spring buffers are provided, such as the leaf springs N.

Figure 2:
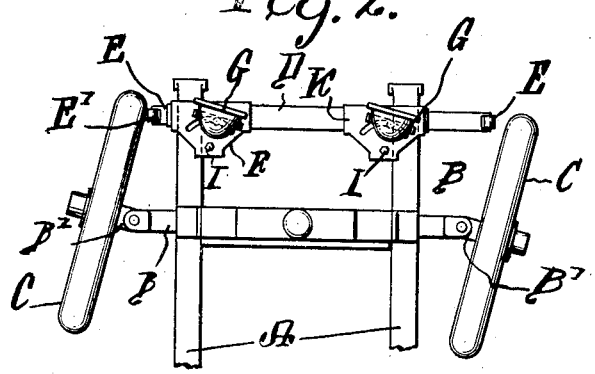
Fig. 2 is a similar view to Fig. 1, but shows the wheels in the position for going to the right, with the headlights turned through the proper angle for illuminating the roadbed.
Figure 3:
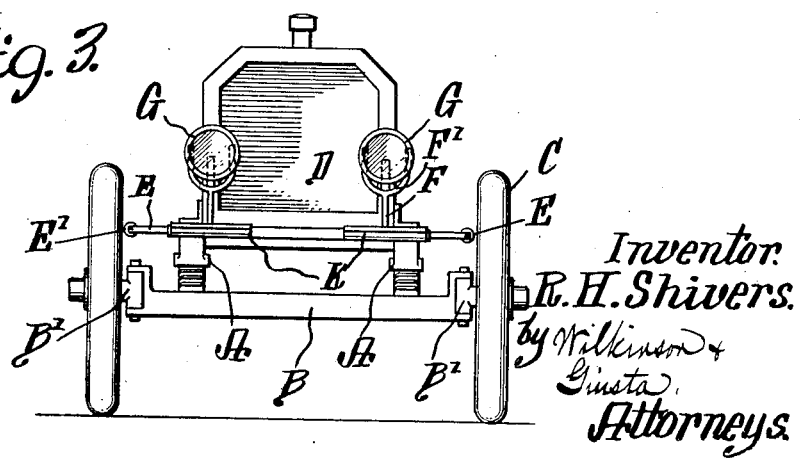
Fig. 3 is a front elevation of an automobile, the wheels and headlights being in the position shown in Fig. 1.

It will be noted that when the front wheels are set by the steering gear in the straight ahead position shown in Fig. 1, the two arms H will be held by the spring catches M in the centered position. When the wheels are turned to the right or left, for instance to the right as shown in Fig. 2 for the purpose of making a right turn, or following a bend to the right in the road, the sliding bar E is automatically pushed to the right, swinging the headlights to the right and they will then assume the position shown in Fig. 2.

When the wheels are righted again the opposite wheel will push on the other end of the bar, restoring the parts to the initial position.

Since it will be only desirable to have the device operate where there are considerable turns in the road, or when it is desired to turn the vehicle itself, it will be desirable to have more or less clearance between the rollers E' at the end of the bar E and the adjacent surface of the wheel tires so that the apparatus may not be too sensitive in its action.

In order to remove the bar E from the sleeve D take out the stop pin $e'$, turn the wheels so that the ends of the bar clear the rollers E' and pull out the bar. To return the bar, reverse the operation.

It may be desirable to remove the bar during the use of the vehicle by day, or whenever it is desired not to use the automatic directing apparatus herein described, in which case the arms H may be moved to the centered position, and will be held in this position by the spring latches M, and thus the headlights may be held in the normal position, or that for illuminating the road straight ahead.

It will be obvious that various modifications might be made in the herein described apparatus, and in the construction, combination and arrangement of parts which could be used without departing from the spirit of my invention; and I do not mean to limit the invention to such details except as particularly pointed out in the claims.

Having thus described my invention what I claim and desire to secure by Letters Patent of the United States is:—

1. An automatic director for head lights for wheeled vehicles provided with tires and head lights carried on standards, comprising a sleeve with means for attaching said sleeve to the body frame of the vehicle, a bar of slightly less length than the distance between the adjacent wheels of the vehicle, slidably mounted in said sleeve, said bar being provided at each end with a roller adapted to engage the side face of the adjacent tire, and also with notches to engage the standards of the head lights, boxes connected to said sleeve, and arms pivoted in said boxes and engaging said standards near their lower ends, substantially as described.

2. An automobile director for head lights for wheeled vehicles provided with tires and head lights carried on standards, comprising a sleeve with means for attaching said sleeve to the body frame of the vehicle, a bar of slightly less length than the distance between the adjacent wheels of the vehicle, slidably mounted in said sleeve, said bar being provided at each end with a roller adapted to engage the side face of the adjacent tire, and also with notches to engage the standards of the head lights, boxes connected to said sleeve, and arms pivoted in said boxes and engaging said standards near their lower ends, with spring latches mounted in said boxes and normally locking said arms in the position for holding said rollers out of engagement with either of the adjacent tires, substantially as described.

3. An automatic director for head lights for wheeled vehicles provided with tires and head lights carried on standards, comprising antifriction rollers journaled on said standards near the lower ends thereof, a sleeve with means for attaching said sleeve to the body frame of the vehicle, a bar of slightly less length than the distance between the adjacent wheels of the vehicle, slidably mounted in said sleeve, said bar being provided at each end with a roller adapted to engage the side face of the adjacent tire, and also with notches to engage the rollers on the standards of the head lights, boxes connected to said sleeve, and arms pivoted in said boxes and engaging said standards near their lower ends, substantially as described.

4. An automatic director for head lights for wheeled vehicles provided with tires and head lights carried on standards, comprising antifriction rollers journaled on said standards near the lower ends thereof, a sleeve with means for attaching said sleeve to the body frame of the vehicle, a bar of slightly less length than the distance between the adjacent wheels of the vehicle, slidably mounted in said sleeve, said bar being provided at each end with a roller adapted to engage the side face of the adjacent tire, and also with notches to engage the rollers on the standards of the head lights, boxes connected to said sleeve, arms pivoted in said boxes and engaging said standards near their lower ends, and spring latches mounted in said boxes and normally locking said arms in the position for holding said rollers out of engagement with either of the adjacent tires, substantially as described.

5. An automatic director for head lights for wheeled vehicles provided with tires and head lights carried on standards, comprising a sleeve with means for attaching said sleeve to the body frame of the vehicle, a bar of slightly less length than the distance between the adjacent wheels of the vehicle, slidably mounted in said sleeve, said bar being provided at each end with a roller adapted to engage the side face of the adjacent tire, and also with notches to engage the standards of the head lights, boxes connected to said sleeve, and arms pivoted in said boxes and engaging said standards near their lower ends, with buffer springs in said boxes serving as shock absorbers to said arms, substantially as described.

6. An automatic director for head lights for wheeled vehicles provided with tires and head lights carried on standards, comprising a sleeve with means for attaching said sleeve to the body frame of the vehicle, a bar of slightly less length than the distance between the adjacent wheels of the vehicle, slidably mounted in said sleeve, said bar being provided at each end with a roller adapted to engage the side face of the adjacent tire, and also with notches to engage the standards of the head lights, boxes connected to said sleeve, and arms pivoted in said boxes and engaging said standards near their lower ends with spring latches mounted in said boxes and normally locking said arms in the position for holding said rollers out of engagement with either of the adjacent tires, with buffer springs in said boxes serving as shock absorbers to said arms, substantially as described.

7. An automatic director for head lights for wheeled vehicles provided with tires and head lights carried on standards, comprising antifriction rollers journaled on said standards near the lower ends thereof, a sleeve with means for attaching said sleeve to the body frame of the vehicle, a bar of slightly less length than the distance between the adjacent wheels of the vehicle, slidably mounted in said sleeve, said bar being provided at each end with a roller adapted to engage the side face of the adjacent tire, and also with notches to engage the rollers on the standards of the head lights, boxes connected to said sleeve, and arms pivoted in said boxes and engaging said standards near their lower ends, with buffer springs in said boxes serving as shock absorbers to said arms, substantially as described.

8. An automatic director for head lights for wheeled vehicles provided with tires and head lights carried on standards, comprising antifriction rollers journaled on said standards near the lower ends thereof, a sleeve with means for attaching said sleeve to the body frame of the vehicle, a bar of slightly less length than the distance between the adjacent wheels of the vehicle, slidably mounted in said sleeve, said bar being provided at each end with a roller adapted to engage the side face of the adjacent tire, and also with notches to engage the rollers on the standards of the head lights, boxes connected to said sleeve, arms pivoted in said boxes and engaging said standards near their lower ends, and spring latches mounted in said boxes and normally locking said arms in the position for holding said rollers out of engagement with either of the adjacent tires, with buffer springs in said boxes serving as shock absorbers to said arms, subtantially as described.

ROBERT HARPER SHIVERS.